(12) United States Patent
Bucking

(10) Patent No.: US 10,634,185 B2
(45) Date of Patent: Apr. 28, 2020

(54) VIBRATION RESISTANT FLEX FLANGE BALL STUD

(71) Applicant: BorgWarner Inc., Auburn Hills, MI (US)

(72) Inventor: Michael Bucking, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 819 days.

(21) Appl. No.: 14/783,475

(22) PCT Filed: Apr. 8, 2014

(86) PCT No.: PCT/US2014/033289
§ 371 (c)(1),
(2) Date: Oct. 9, 2015

(87) PCT Pub. No.: WO2014/172144
PCT Pub. Date: Oct. 23, 2014

(65) Prior Publication Data
US 2016/0076582 A1    Mar. 17, 2016

Related U.S. Application Data

(60) Provisional application No. 61/813,749, filed on Apr. 19, 2013.

(51) Int. Cl.
*F16C 11/06* (2006.01)
*F16C 11/08* (2006.01)
(52) U.S. Cl.
CPC .......... *F16C 11/0604* (2013.01); *F16C 11/08* (2013.01)

(58) Field of Classification Search
CPC .................. F16C 11/06; F16C 11/0604; Y10T 403/32631
See application file for complete search history.

(56) References Cited

U.S. PATENT DOCUMENTS 7,441,979 B2   10/2008   Heidemann et al.
2005/0095084 A1   5/2005   Hansen
(Continued)

FOREIGN PATENT DOCUMENTS

JP          07158631 A       6/1995
JP         2005240905 A       9/2005
WO    WO-2011047830 A1 *   4/2011   ............... B66C 1/66

OTHER PUBLICATIONS

International Search Report and Written Opinion in International Application No. PCT/US2014/033289, dated Jul. 24, 2014.

*Primary Examiner* — Matthieu F Setliff
(74) *Attorney, Agent, or Firm* — Eric L. Doyle; Stephan A. Pendorf; Patent Central LLC

(57) ABSTRACT

A ball stud (12) with a relatively short grip length, adapted for use with a turbocharger, having a flexible flange (18) extending from a center of the ball stud (12). The flexible flange (18) is between a ball section (14) and a first shaft portion (20) adjacent to the flexible flange (18) and preferably a narrower threaded shaft portion (22) extending further from the ball section (14). The first shaft portion (20) may be tapered to fit in a complementary aperture (32) of a plate (30). The flexible flange (18) preferably includes a narrow circumference (24) adjacent to a center of the ball stud (12) with a circumferential lip (26) adapted to engage a plate (30). The flexible flange (18) allows subtle flex for thermal expansion and essentially changes a spring rate of the ball stud (12) to emulate a longer fastener.

5 Claims, 4 Drawing Sheets

(56) References Cited

U.S. PATENT DOCUMENTS

2005/0191119 A1 9/2005 Aoshima et al.
2011/0217112 A1 9/2011 Seol et al.

* cited by examiner

VIBRATION RESISTANT FLEX FLANGE BALL STUD

CROSS-REFERENCE TO RELATED APPLICATION

This application claims priority to and all benefits of U.S. Provisional Application 61/813,749, filed on Apr. 19, 2013, entitled "Flex Flange Vibration Resistant Ball Stud".

BACKGROUND

Field of the Disclosure

This disclosure relates to a ball stud with a flex flange. More particularly, this disclosure relates to a ball stud with a relatively short grip length having a flex flange between a ball end and a shaft end that essentially changes the spring rate of the ball stud to emulate a longer fastener.

Description of Related Art

Advantages of turbocharging include increased power output, lower fuel consumption and reduced pollutant emissions. The turbocharging of engines is no longer primarily seen from a high-power performance perspective, but is rather viewed as a means of reducing fuel consumption and environmental pollution on account of lower carbon dioxide ($CO_2$) emissions. Currently, a primary reason for turbocharging is using exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber in a controlled manner. Consequently, more fuel can be burned, so that the engine's power output increases relative to the speed and swept volume.

In exhaust gas turbocharging, some of the exhaust gas energy, which would normally be wasted, is used to drive a turbine. The turbine includes a turbine wheel that is mounted on a rotatable shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor impeller that is mounted on the same rotatable shaft so that rotation of the turbine wheel causes rotation of the compressor impeller.

Turbochargers typically include a turbine housing connected to the engine's exhaust manifold, a compressor housing connected to the engine's intake manifold, and a bearing housing coupling the turbine and compressor housings together. The bearing housing encloses and supports the rotatable shaft.

Turbocharger systems often use ball studs in linkage applications. Variable Turbine Geometry (VTG) turbochargers are known, and such turbochargers may use ball studs for linkage applications that involve regulating the VTG mechanisms located in the turbine housing. More powerful actuators (SBS, CBA) have increased VTG linkage loading for existing designs. Turbochargers often are compact to fit within engine compartments or other tight spaces. High strength fasteners and ball studs are known for linking components, such as VTG linkages, wastegate bracket joints and others.

Fastener deformation is recommended with grip length over nominal diameter ratio more than six. But turbocharger applications typically use fastener and ball stud designs with relatively short grips lengths having less than six-times nominal bolt diameter.

Turbocharger applications use ball studs that often require relatively short grip lengths to accommodate tight spaces, small packaging environments, and turbocharger specifications. Standard ball studs with short grip lengths result in stiff fasteners, i.e. short bolts and joints, which result in high material embedding. Embedding in turbocharger bolted joints is the partial collapse due to local yielding of materials in clamped surfaces of bolted joints. High turbocharger temperatures (cause material creep), few fasteners for a load (cause more stress per fastener), and limited flange head fasteners (cause high stress) can all cause high embedding in bolted joints. High embedding of bolted joints contributes to lowering of fastener preload, which can result in loss of overall minimum clamp load, less effective bolted joints, and joint failure, especially for multi-plate applications.

Lock threading methods, locking nuts and nut capture methods have been incorporated to prevent self-loosening of ball studs. Side-to-side or transverse loading is the worst for self-loosening of a bolted joint.

SUMMARY

This disclosure relates to a flex flange ball stud that is relatively short but has customizable stiffness by adjusting the flange to be springier as desired. Spring rates can be tailored by the design, thickness and size of the flexible flange. The flexible flange can essentially change the spring rate of the ball stud, emulating a longer fastener. Longer fasteners tolerate force loading deviations with longer fatigue life, lower preload loss (more effective clamp-loading) and lower material embedding.

It is desirable for bolted joint applications to have an effective spring rate due to thermal expansion variation with high temperatures in turbocharger applications, high vibration, and applied loading.

A ball stud design may include a ball section with a hex head extending above a flexible flange. A shaft is adjacent to the flexible flange with a preferred narrower threaded shaft portion extending farther opposite the ball end. The flange allows subtle flex for thermal expansion.

The flex flange ball stud allows for thermal expansion variation, high vibration applied loading, and effective spring K (stiffness) management, which is critical for short grip lengths associated with turbocharger bolted joints. It lowers embedding and eliminates loss of preload. As such, a flex flange ball stud is vibration resistant and more tolerant of loads.

The flex flange ball stud may eliminate additional components, such as nuts. While the design may be used with an nut, a nut may be eliminated if the design is used with tapered hole applications. Besides nuts, locking threads and mechanical capture features can be eliminated as prevention of self-loosening of the ball stud is less important when using the flex flange ball stud. This results in lowered cost and improved ease of assembly.

The flex flange ball stud allows for drop-in replacement and can be easily integrated into existing turbocharger applications.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE EMBODIMENTS

Figure 1:
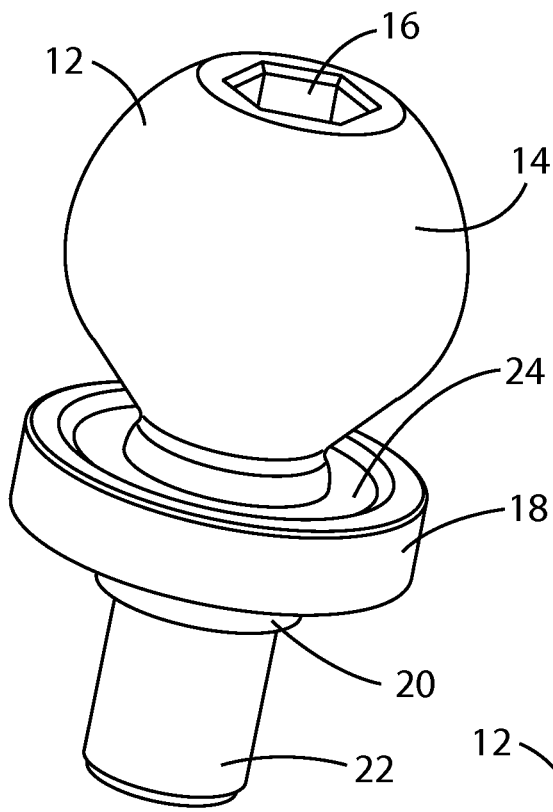
FIG. 1 is a perspective view of a ball stud with a flexible flange adapted for use with a turbocharger.
Figure 2:
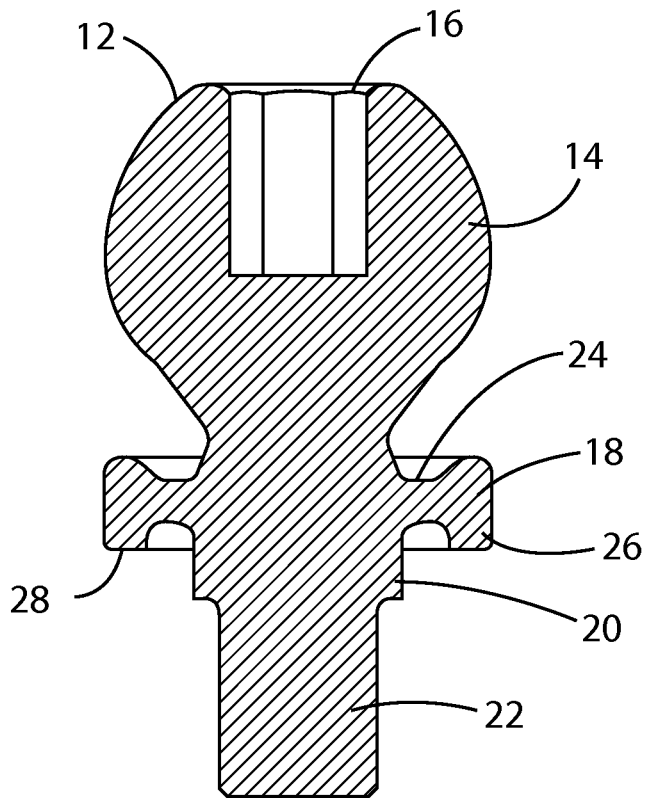
FIG. 2 is a cross-sectional side view of the ball stud with the flexible flange.

A turbocharger is generally known and includes a turbine and a compressor, wherein a compressor impeller is rotatably driven via a rotatable shaft by a turbine wheel. The turbocharger often uses ball studs in linkage applications. Short grip lengths are often associated with turbocharger bolted joints.

Referring to FIGS. 1 through 4, a ball stud 12 may include a ball section 14 with a hex head 16 extending above a flexible flange 18. The flexible flange 18 extends from a center of the ball stud 12. A first shaft portion 20 extending opposite the ball section 14 is preferably adjacent to the flexible flange 18 with a narrower threaded shaft portion 22 extending further from the ball section 14. The flexible flange 18 allows subtle flex for thermal expansion and essentially changes the spring rate of the ball stud 12 to emulate a longer fastener.

The flexible flange 18 preferably has a narrow circumference 24 closest to the center of the ball stud 12 with a distal circumferential lip 26 adapted to engage a plate 30. The narrow circumference 24 assists with flex while the thicker circumferential lip 26 preferably has a flat end 28 that engages a plate 30 that is also flat.

Figure 3:
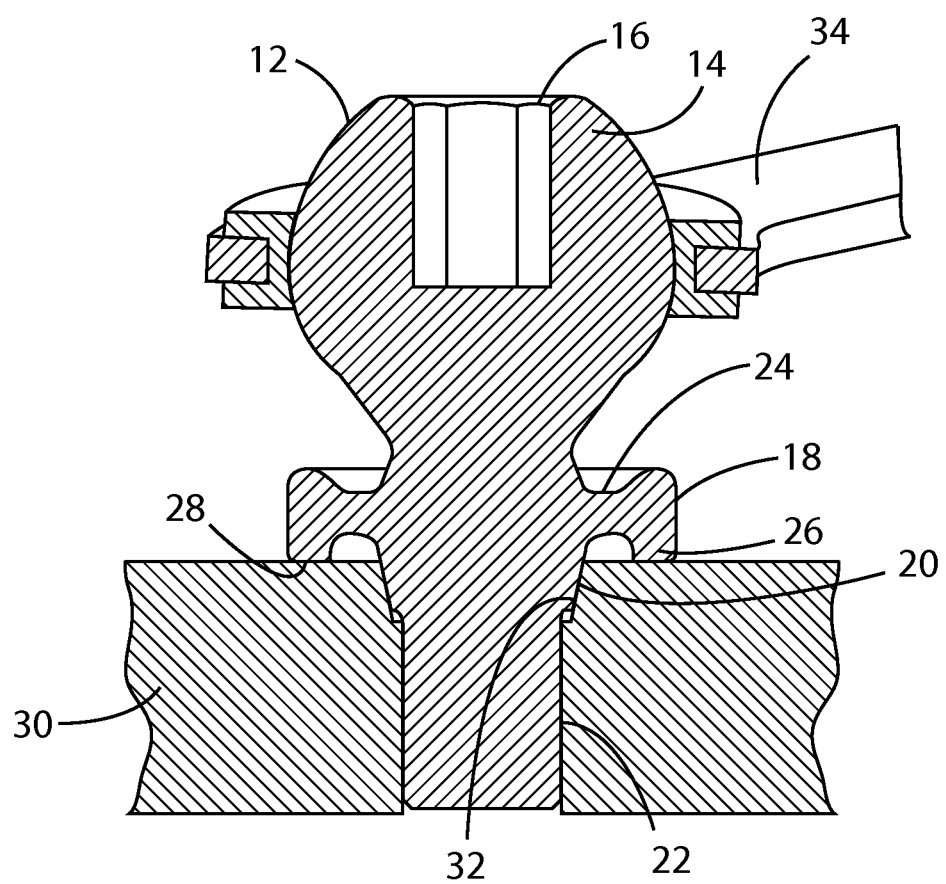
FIG. 3 shows a cross-sectional view of a ball stud with a flexible flange with its shaft and threaded shaft portion in a plate.

FIG. 3 shows a ball stud 12 with a flexible flange 18 with its shaft portion 20 and threaded shaft portion 22 in a plate 30. The shaft portion 20 may be tapered to a narrower diameter as moving away from the flexible flange 18 and adapted to sit in a complementary shaped tapered plate aperture 32. A sample actuator arm 34 of a VTG mechanism may function as part of the actuator and linkage in conjunction with the plate 30.

Figure 4:
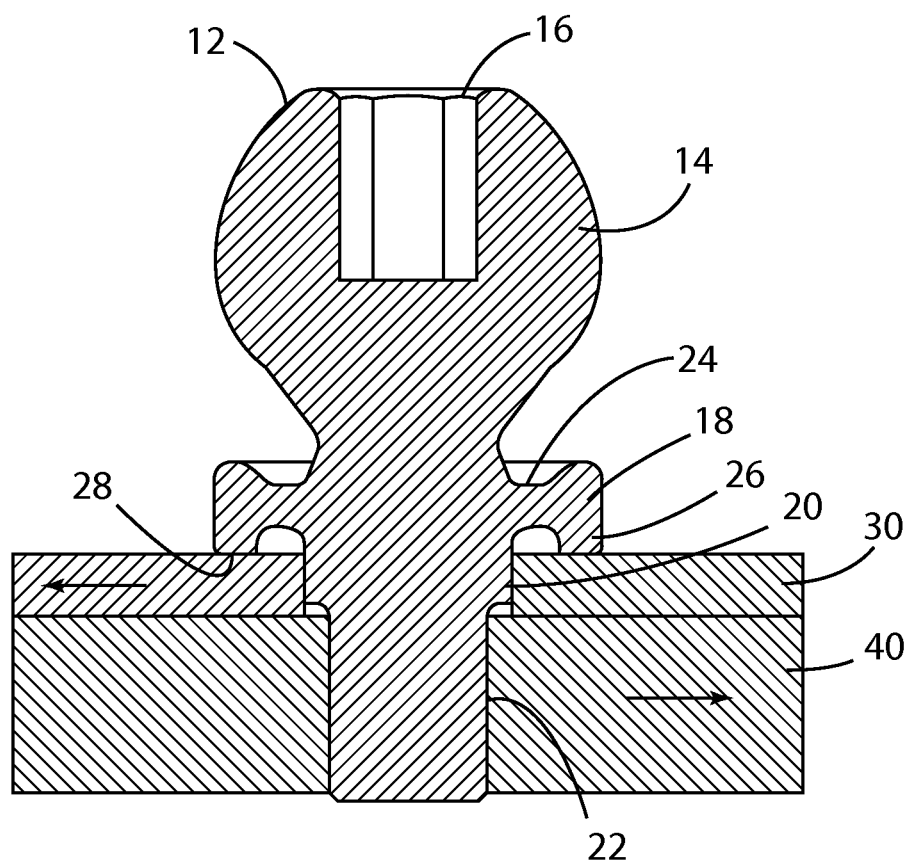
FIG. 4 shows a cross-sectional view of a ball stud with a flexible flange with its first shaft portion in association with one plate and its threaded shaft portion in a second plate.

FIG. 4 shows the ball stud 12 with a flexible flange 18 for clamping multiple plates with its shaft portion 20 in association with one plate 30 and its farther extending threaded shaft portion 22 with a second plate 40. The ball stud 12 can be well suited for clamping multiple plates having different forces. The ball stud 12 can readily accommodate a force against one shaft portion 20 that is in a different direction from the force on the threaded shaft portion 22. It is understood that the shaft portion 20 may be tapered to in a complementary shaped tapered plate aperture of the first plate 30.

Figure 5:
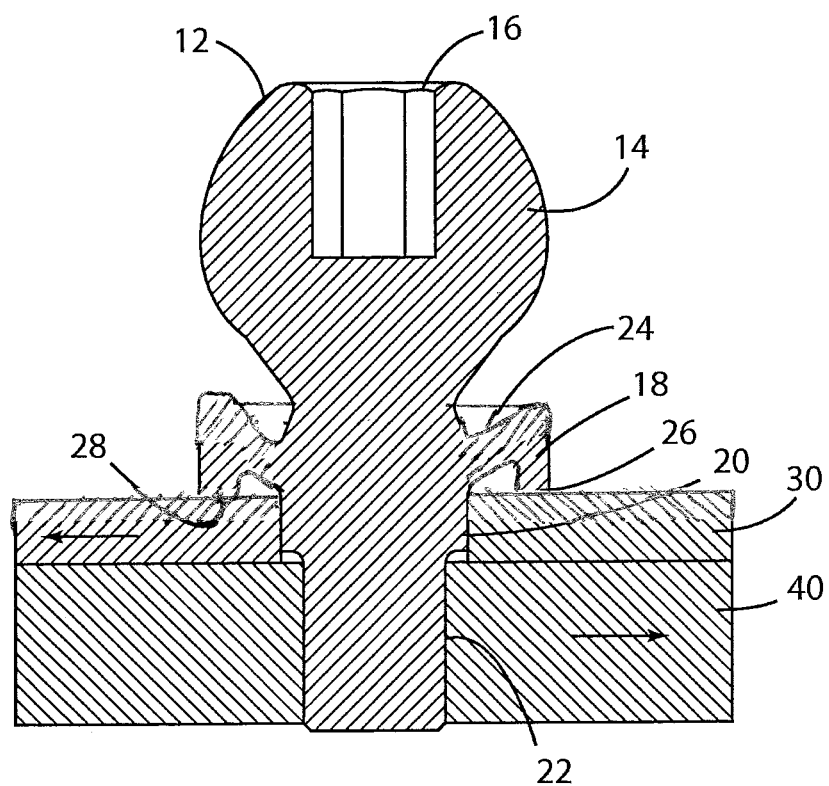
FIG. 5 shows a cross-sectional view of the ball stud of FIG. 4, with a flexible flange flexing due to thermal expansion of a plate.

FIG. 5 differs from FIG. 4 in that it shows flexible flange 18 flexing due to thermal expansion of plate 30.

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically described.

What is claimed is:

1. A ball stud (12) having a nominal bolt diameter, a grip length less than six-times the nominal bolt diameter adapted for use with a turbocharger, the ball stud (12) including a flexible flange (18) extending from a center of the ball stud (12) between a ball section (14) on a ball side of the flexible flange (18) and a first shaft portion (20) on a shaft side of the flexible flange (18), wherein the flexible flange (18) includes a circumferential lip (26) and an intermediate section (24) between the center of the ball stud (12) and the circumferential lip (26), wherein the intermediate section exhibits flex, and wherein the flexible flange (18) changes a spring rate of the ball stud (12) to emulate a spring rate of the ball stud (12) having a grip length greater than six-times nominal bolt diameter.

2. The ball stud (12) of claim 1 wherein the first shaft portion (20) is tapered and adjacent to the flexible flange (18).

3. The ball stud (12) of claim 1 further comprising a threaded shaft portion (22) extending further from the ball section (14).

4. A ball stud (12) having a nominal bolt diameter, a grip length less than six-times the nominal bolt diameter-adapted for clamping multiple plates for use with a turbocharger, the ball stud (12) including a flexible flange (18) extending from a center of the ball stud (12) between a ball section (14) and a first shaft portion (20) adjacent to the flexible flange (18) and a threaded shaft portion (22) extending further from the ball section (14), wherein the first shaft portion (20) is adapted for use in association with a first plate (30) and the threaded shaft (22) is adapted for use in association with a second plate (40) wherein the flexible flange (18) includes a circumferential lip (26) and an intermediate section (24) between the center of the ball stud (12) and the circumferential lip (26), wherein the intermediate section exhibits flex, and wherein the flexible flange (18) changes a spring rate of the ball stud (12) to emulate a spring rate of the ball stud (12) having a grip length greater than six-times nominal bolt diameter.

5. The ball stud (12) of claim 4 wherein the first shaft portion (20) is tapered away from the flexible flange (18) to fit in a complementary plate aperture (32) of the first plate (30).

\* \* \* \* \*